(12) United States Patent
Kobayashi et al.

(10) Patent No.: US 7,578,760 B2
(45) Date of Patent: Aug. 25, 2009

(54) AUTOMATIC TRANSMISSION CONTROLLER FOR A VEHICLE AND METHOD FOR CONTROLLING AN AUTOMATIC TRANSMISSION SYSTEM FOR A VEHICLE

(75) Inventors: Nobufusa Kobayashi, Anjou (JP); Toshio Sugimura, Ann Arbor, MI (US); Tomohiro Asami, Nissin (JP); Takaaki Tokura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 113 days.

(21) Appl. No.: 11/838,487

(22) Filed: Aug. 14, 2007

(65) Prior Publication Data

US 2008/0064563 A1 Mar. 13, 2008

(30) Foreign Application Priority Data

Sep. 13, 2006 (JP) ............................. 2006-248661

(51) Int. Cl.
*F16H 31/00* (2006.01)
*G06F 7/00* (2006.01)
(52) U.S. Cl. ........................................ 475/121; 701/66
(58) Field of Classification Search ................. 475/118, 475/121
See application file for complete search history.

(56) References Cited

U.S. PATENT DOCUMENTS 5,754,968 A * 5/1998 Hedstrom .................... 701/66

6,514,165 B2 * 2/2003 Saito .......................... 475/118

FOREIGN PATENT DOCUMENTS

| DE | 198 54 254 A1 | 5/2000 |
|---|---|---|
| JP | 08-193654 | 7/1996 |
| JP | 10-089466 | 4/1998 |
| JP | 11-082729 | 3/1999 |
| JP | 11-201271 | 7/1999 |
| JP | 2001-132835 | 5/2001 |
| JP | 2003-106440 | 4/2003 |
| JP | 2005-188544 | 7/2005 |
| JP | 2006-046569 | 2/2006 |
| WO | WO 2006/059754 A1 | 6/2006 |

* cited by examiner

*Primary Examiner*—Dirk Wright
(74) *Attorney, Agent, or Firm*—Oblon, Spivak, McClelland, Maier & Neustadt, P.C.

(57) ABSTRACT

An automatic transmission controller for a vehicle has an insufficient gear shifting time determining device that determines whether a gear shifting time for shifting performed by disengagement of two engaging elements and engagement of two engaging elements is insufficient; and a double engage/disengage prohibiting device that prohibits the gear shift after the disengagement of two engaging elements and engagement of two engaging elements when the insufficient shifting time determining device determines that the gear shifting time for shifting after the disengagement of two engaging elements and engagement of two engaging elements is insufficient.

4 Claims, 9 Drawing Sheets

FIG. 2

|      | C1  | C2  | C3  | C4  | B1  | B2  | F1  |
|------|-----|-----|-----|-----|-----|-----|-----|
| P    |     |     |     |     |     |     |     |
| Rev1 |     |     | ○   |     |     | ○   |     |
| Rev2 |     |     |     | ○   |     | ○   |     |
| N    |     |     |     |     |     |     |     |
| 1st  | ○   |     |     |     |     | (○) | ○   |
| 2nd  | ○   |     |     |     | ○   |     |     |
| 3rd  | ○   |     | ○   |     |     |     |     |
| 4th  | ○   |     |     | ○   |     |     |     |
| 5th  | ○   | ○   |     |     |     |     |     |
| 6th  |     | ○   |     | ○   |     |     |     |
| 7th  |     | ○   | ○   |     |     |     |     |
| 8th  |     | ○   |     |     | ○   |     |     |

○ : ENGAGED

AUTOMATIC TRANSMISSION CONTROLLER FOR A VEHICLE AND METHOD FOR CONTROLLING AN AUTOMATIC TRANSMISSION SYSTEM FOR A VEHICLE

INCORPORATION BY REFERENCE

The disclosure of Japanese Patent Application No. 2006-248661 filed on Sep. 13, 2006 including the specification, drawings, and abstract is incorporated herein by reference in its entirety.

BACKGROUND OF THE INVENTION

1. Field of the Invention

The present invention relates to an automatic transmission controller for a vehicle and a method for controlling an automatic transmission system for a vehicle having different gear ratios that are established by selectively engaging a plurality of engaging elements.

2. Description of the Related Art

Automatic transmissions for a vehicle, which establish a plurality of speed steps having different gear ratios by selectively engaging a plurality of engaging elements, are used in a variety of vehicles. In recent years, in order to reduce fuel consumption and improve drivability, there has been a trend toward automatic transmissions for a vehicle with a higher number of speeds. Because of the increasing number of speeds in such automatic transmissions for a vehicle, multistep gear shifts, for example, from seventh gear to fourth gear, are often made. In such multistep gear shifts, it sometime occurs that two engaging elements are disengaged (two-element disengagement) and two engaging elements are engaged (two-element engagement), resulting in a gear shift that entails disengagement and re-engagement of four engagement elements. The Japanese Patent Application Publication No. JP-A-2003-106440 describes such gear shift control of an automatic transmission, wherein, for example, when shifting from sixth gear to third gear, the fifth gear, which is close in gear ratio to the sixth gear, is set as the intermediate gear, control being executed to make a gear shift to third gear via the fifth gear, which is the intermediate gear, thereby suppressing gear shift shock, for example.

In a gear shift entailing disengagement of two engaging elements and engagement of two engaging elements, with the art described in the Japanese Patent Application Publication No. JP-A-2003-106440, the gear shift time required to go from the starting gear to completion of the gear shift is increased, for example, by executing a gear shift to an intermediate gear. When the vehicle is running at a low speed, that is, when the rotating shaft of the transmission is rotating at a low speed, because there is a small difference in rotational speed between the synchronization speed and the input shaft of the transmission, the time for synchronization of the input shaft rotational speed to the synchronizing speed is shortened. As a result, in contrast to the usual situation, in which it is necessary to make the synchronization time and the time required for gear shifting approximately the same, there is a possibility that gear shift shock occurs at the time of a gear shift because there is insufficient time for gear shifting.

SUMMARY OF THE INVENTION

The present invention provides an automatic transmission controller for a vehicle and a method for controlling an automatic transmission system for a vehicle that, in a gear shift that performs engagement of two engaging elements and disengagement of two engaging elements, suppress shift shock at the time of gear shift.

A first aspect of the present invention is an automatic transmission controller for a vehicle that has: an automatic transmission that establishes a first speed step by engaging a first engaging element and a second engaging element, and that establishes a second speed step by engaging a third engaging element and a fourth engaging element; a transmission controller that controls a double engaging/disengaging gear shift that disengages the first engaging element and the second engaging element and engages the third engaging element and the fourth engaging element in shifting from the first speed step to the second speed step; an insufficient gear shifting time determining device that determines whether a gear shifting time for shifting from the first speed step to the second speed step is insufficient; and a double engage/disengage prohibiting device that prohibits the gear shift from the first speed step to the second speed step when the insufficient shifting time determining device determines that the gear shifting time for shifting from the first speed step to the second speed step is insufficient.

In the automatic transmission controller noted in the above aspect, the gear ratio of the first speed step may be smaller than that of the second speed step, and the gear shift from the first speed step to the second speed step may be a downshift.

In the controller noted in the above aspect, the insufficient gear shifting time determining device may determine that the gear shifting time is insufficient when the vehicle speed calculated by a vehicle speed determining device is below a prescribed vehicle speed.

A second aspect of the present invention is a method for controlling an automatic transmission system for a vehicle, in which the automatic transmission system for a vehicle includes an automatic transmission that establishes a first speed step by engaging a first engaging element and a second engaging element, and that establishes a second speed step by engaging a third engaging element and a fourth engaging element, and a transmission controller that controls a double engaging/disengaging gear shift that disengages the first engaging element and the second engaging element and engages the third engaging element and the fourth engaging element in shifting from the first speed step to the second speed step. This method includes determining whether a gear shifting time for shifting from the first speed step to the second speed step is insufficient, and prohibiting the gear shift from the first speed step to the second speed step when it is determined that the gear shifting time for shifting from the first speed step to the second speed step is insufficient.

According to the automatic transmission controller noted in the above first aspect, because the gear shift from the first speed step to the second speed step is prohibited by a double engage/disengage prohibiting device when the insufficient gear shifting time determining device determines that the gear shifting time is insufficient to shift from a first speed step to a second speed step, it is possible to stop the execution of a gear shift for which the gear shifting time is insufficient, and thereby avoid the generation of shift shock by such a gear shift.

Also, according to the automatic transmission controller of the first aspect of the present invention, the gear ratio of the first speed step is smaller than that of the second speed step and the gear shift from the first speed step to the second speed step is a downshift, it is possible to suppress shift shock when a gear shift is made toward in the downshifting direction.

According to the automatic transmission controller of the first aspect of the present invention, because the insufficient gear shifting time determining device determines that the gear shifting time is insufficient when the calculated vehicle speed is below a prescribed vehicle speed, it is easy to determine that the gear shifting time is insufficient.

BRIEF DESCRIPTION OF THE DRAWINGS

The foregoing and further features, and advantages of the invention will become apparent from the following description of example embodiments with reference to the accompanying drawings, wherein like numerals are used to represent like elements, and wherein:

FIG. 2 is an operation table describing the operation of the engaging elements in the automatic transmission of FIG. 1 that establishes a plurality of gear speeds;

DETAILED DESCRIPTION OF THE PREFERRED EMBODIMENTS

Embodiments of the present invention are described below with reference to the drawings.

Figure 1:
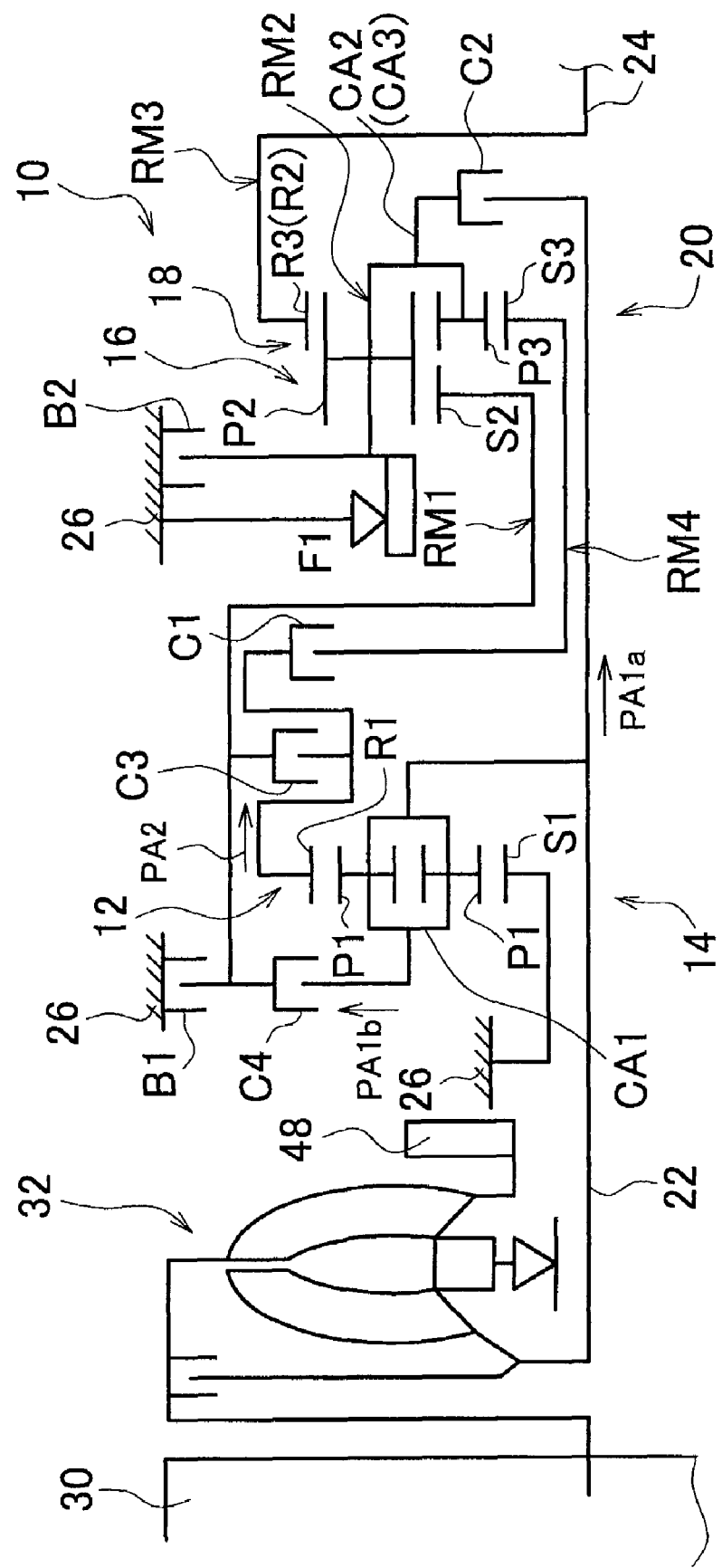
FIG. 1 is a schematic interconnection diagram describing the configuration of an automatic transmission for a vehicle to which the present invention is preferably applied.

FIG. 1 is a schematic interconnection diagram of an automatic transmission 10 for a vehicle (hereinafter "automatic transmission") suitable for application of the present invention. FIG. 2 is an operation table describing the operation of the engaging elements in establishing a plurality of different speed steps in the automatic transmission 10. The automatic transmission 10 has, inside of a transmission case (hereinafter "case") 26, which is a non-rotating member mounted to the vehicle body, a first transmission part 14 having a double-pinion type first planetary gear unit 12 as a main part, and a second transmission part 20 having a single-pinion type second planetary gear unit 16 and a double-pinion type third planetary gear unit 18 as main parts, these being disposed on a common axis, wherein the rotation of the input shaft 22 is gear-shifted and output from the output shaft 24. The input shaft 22 is an input rotating member and, in this embodiment, is the turbine shaft of a torque converter 32 rotationally driven by an engine 30 that is the power source for running. The output shaft 24 is an output rotating member that, via a differential gear unit (final gear reducer) and then a pair of axles, rotationally drives the driven wheels. The automatic transmission 10 is substantially symmetrical with respect to the axle center, accordingly the bottom half is not depicted in the schematic interconnection diagram of FIG. 1.

The first planetary gear unit 12 has a sun gear S1, a plurality of pairs of pinion gears P1 that are mutually meshed, a carrier CA1 that supports the pinion gear P1 to enable both axial rotation and orbital revolution thereof, and a ring gear R1 meshed with the sun gear S1 via the pinion gears P1, the sun gear S1, the carrier CA1 and the ring gear R1 forming three rotating elements. The carrier CA1 is linked to and rotationally driven by the input shaft 22, and the sun gear S1 is fixed as one with the case 26 so as not to be able to rotate. The ring gear R1 functions as an intermediate output member, is caused to rotate at a reduced speed relative to the input shaft 22, and transmits rotation to the second transmission part 20. In this embodiment, the path along which the rotation of the input shaft 22 is transmitted without a change of speed to the second transmission part 20 is a first intermediate output path PA1 that transmits rotation at a pre-established gear ratio (=1.0). The first intermediate output path PA1 includes a direct path PA1$a$ that transmits rotation from the input shaft 22 to the second transmission part 20 without passing through the first planetary gear unit 12, and an indirect path PA1$b$ that transmits rotation from the input shaft 22 to the second transmission part 20 via the carrier CA1 of the first planetary gear unit 12. The path transmitting from the input shaft 22 to the second transmission part 20 via the carrier CA1, the pinion gear P1 disposed at the carrier CA1, and the ring gear R1 is a second intermediate output path PA2 that transmits rotation of the input shaft 22 with a gear ratio that is larger than that of the first intermediate output path PA1 (that is, larger than 1.0).

The second planetary gear unit 16 has a sun gear S2, a pinion gear P2, and a carrier CA2 that supports the pinion gear P2 to enable both axial rotation and orbital revolution thereof, and a ring gear R2 meshed with the sun gear S2 via the pinion gear P2. The third planetary gear unit 18 has a sun gear S3, a plurality of pairs of pinion gears P2 and P3 that are mutually meshed, a carrier CA3 that supports the pinion gears P2 and P3 to enable both rotation and orbital rotation thereof, and a ring gear R3 meshed with the sun gear S3 via the pinion gears P2 and P3.

The second planetary gear unit 16 and the third planetary gear unit 18, by being partially linked together, form four rotating elements, RM1 to RM4. Specifically, the sun gear S2 of the second planetary gear unit 16 forms the first rotating element RM1, the carrier CA2 of the second planetary gear unit 16 and the carrier CA3 of the third planetary gear unit 18 are linked together as one to form the second rotating element RM2, the ring gear R2 of the second planetary gear unit 16 and the ring gear R3 of the third planetary gear unit 18 are linked together as one to form the third rotating element RM3, and the sun gear S3 of the third planetary gear unit 18 forms the fourth rotating element RM4. In the second planetary gear unit 16 and the third planetary gear unit 18, carriers CA2 and the CA3 are formed by a commonly shared member, and the ring gears R2 and R3 are formed by a commonly shared member. The pinion gear P2 of the second planetary gear unit 16 is a Ravineaux-type planetary gear train that serves also as the second pinion gear of the third planetary gear unit 18.

The automatic transmission 10, in order to establish a plurality of speed steps having different gear ratios has, as engaging elements, a first clutch C1, a second clutch C2, a third clutch C3, and a fourth clutch C4 (hereinafter referred to as "clutch C" when no particular distinction is made), and first and second brakes B1 and B2 (hereinafter referred to as "brake B" when no particular distinction is made). The first rotating element RM1 (the sun gear S2) is selectively linked to the case 26, via the first brake B1, to stop the rotation thereof, is selectively linked, via the third clutch C3, to the ring gear R1 (that is, the second intermediate output path PA2) of the first planetary gear unit 12, which is an intermediate output member, and is further selectively linked, via the fourth clutch C4, to the carrier CA1 of the first planetary gear unit 12 (that is, the intermediate path PA1$b$ of the first intermediate output path PA1). The second rotating element RM2 (the carriers CA2 and CA3) is selectively linked, via the second brake B2, to the case 26 to stop the rotation thereof, and is selectively linked, via the second clutch C2, to the input shaft 22 (that is, the direct path PA1$a$ of the first intermediate output path PA1). The third rotating element RM3 (the ring gears R2 and R3) is linked as one with the output shaft 24 to output rotation. The fourth rotating element RM4 (the sun gear S3) is selectively linked, via the first clutch C1, to the ring gear R1. A one-way clutch F1 is provided between the second rotating element RM2 and the case 26 in parallel with the second brake B2 to allow forward rotation (rotation in the same direction as the input shaft 22) but prevent reverse rotation of the second rotating element RM2.

The operating table of FIG. 2 is a chart that describes the operating conditions of the clutches C1 to C4 and the brakes B1 and B2 when the various speed (gear ratio) steps are established in the automatic transmission 10. In this table, circles indicate the engaged condition, the circle enclosed in parentheses indicates the engaged condition only during engine braking, and blanks indicate the disengaged condition. Because the one-way clutch F1 is provided in parallel with the second brake B2 that establishes the first gear 1st, at the time of starting (accelerating) the second brake B2 does not necessary need to be engaged. The gear ratios for each gear are appropriately established by the gear ratios $\rho1$, $\rho2$, and $\rho3$ of the first planetary gear unit 12, the second planetary gear unit 16, and the third planetary gear unit 18.

Figure 3:
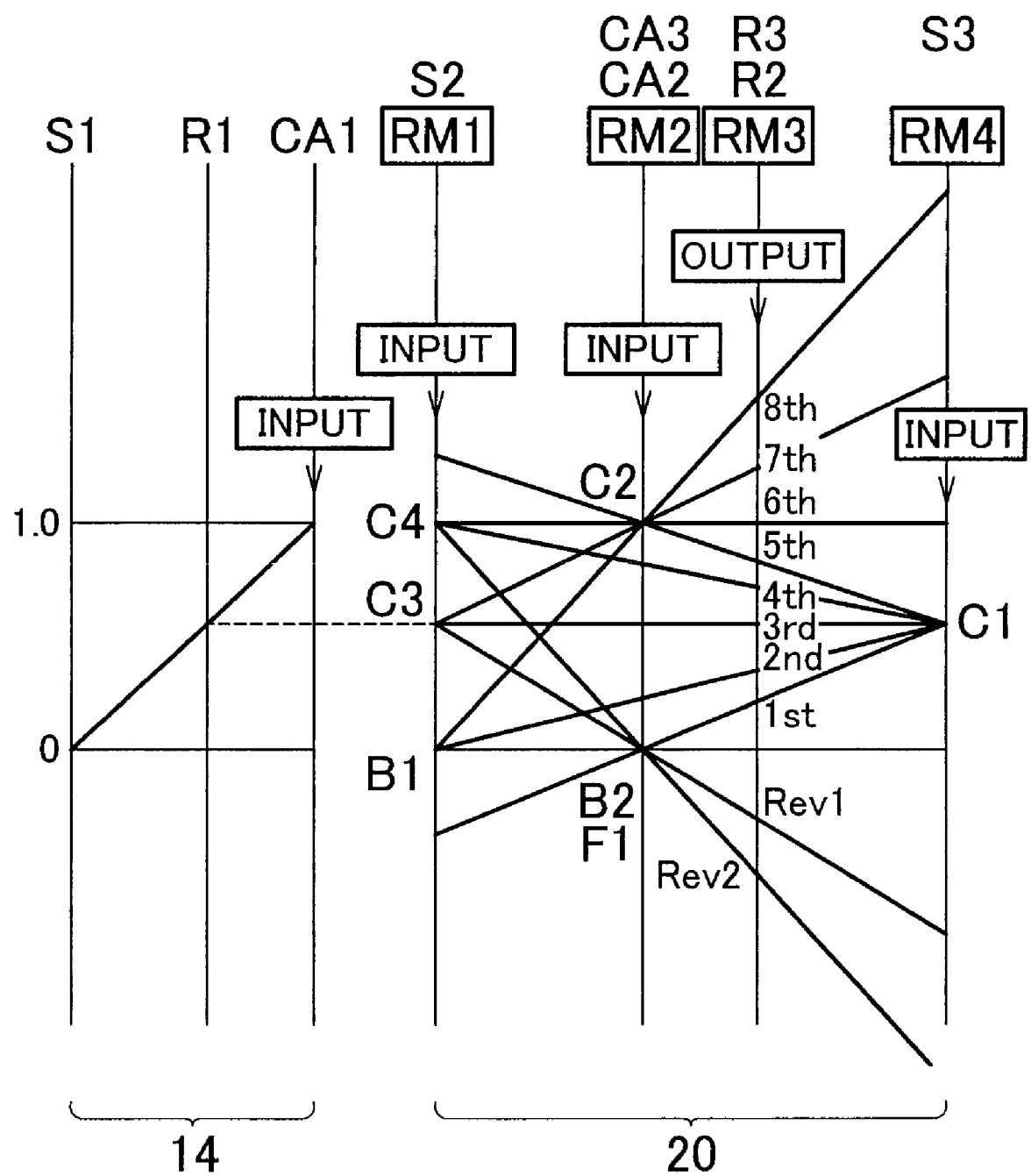
FIG. 3 is a nomogram in which the rotational speeds of each of the rotating elements in first transmission part and a second transmission part provided in the automatic transmission of FIG. 1 can be represented as straight lines.

FIG. 3 is a nomogram in which the rotational speeds of each of the rotating elements in the first transmission part 14 and the second transmission part 20 can be represented as straight lines, in which the lower horizontal lines represent the rotational speed of "0" and the upper horizontal lines represent the rotational speed of "1.0" that is a rotational speed the same as that of the input shaft 22. The vertical lines associated with the first transmission part 14 represent, in sequence from the left, the sun gear S1, the ring gear R1, and the carrier CA1, the spacing therebetween being determined in response to the gear ratio $\rho1$ of the first planetary gear unit 12 (that is, the ratio of (sun gear S1 number of teeth)/(ring gear R1 number of teeth)). The four vertical lines associated with the second transmission part 20 represent, in sequence from the left, the first rotating element RM1 (the sun gear S2), the second rotating element RM2 (the carrier CA2 and the carrier CA3), the third rotating element RM3 (the ring gear R2 and the ring gear R3), and the fourth rotating element RM4 (the sun gear S3), the spacing therebetween being determined in response to the gear ratio $\rho2$ of the second planetary gear unit 16 and the gear ratio $\rho3$ of the third planetary gear unit 18.

As shown in FIG. 2 and FIG. 3, when the first clutch C1 and the second brake B2 are engaged to rotate the fourth rotating element RM4 at a speed reduced via the first transmission part 14 relative to that the input shaft 22 and to stop the rotation of the second rotating element RM2, the third rotating element RM3, which is linked to the output shaft 24, is caused to rotate at a speed indicated by 1st, thereby establishing the first gear (1st), having the largest gear ratio (which is (rotational speed of the input shaft 22)/(rotational speed of the output shaft 24)).

When the first clutch C1 and the first brake B1 are engaged to rotate the fourth rotating element RM4 at a speed reduced via the first transmission part 14 relative to that the input shaft 22 and to stop the rotation of the first rotating element RM1, the third rotating element RM3 is caused to rotate at a speed indicated by 2nd, thereby establishing the second gear (2nd), having a gear ratio that is smaller than that of the first gear (1st).

When the first clutch C1 and the third clutch C3 are engaged to rotate the fourth rotating element RM4 and the first rotating element RM1 at a speed reduced via the first transmission part 14 relative to that of the input shaft 22 and to cause the second transmission part 20 to rotate in concert therewith, the third rotating element RM3 is caused to rotate at a speed indicated by 3rd, thereby establishing the third gear (3rd), having a gear ratio that is smaller than that of the second gear (2nd).

When the first clutch C1 and the fourth clutch C4 are engaged to rotate the fourth rotating element RM4 at a speed reduced via the first transmission part 14 relative to that of the input shaft 22 and to cause the first rotating element RM1 to rotate in concert with the input shaft 22, the third rotating element RM3 is caused to rotate at a speed indicated by 4th, thereby establishing the fourth gear (4th), having a gear ratio that is smaller than that of the third gear (3rd).

When the first clutch C1 and the second clutch C2 are engaged to rotate the fourth rotating element RM4 at a speed reduced via the first transmission part 14 relative to that of the input shaft 22 and to cause the second rotating element RM2 to rotate in concert with the input shaft 22, the third rotating element RM3 is caused to rotate at a speed indicated by 5th, thereby establishing the fifth gear (5th), having a gear ratio that is smaller than that of the fourth gear (4th).

When the second clutch C2 and the fourth clutch C4 are engaged to rotate the second transmission part 20 in concert with the input shaft 22, the third rotating element RM3 is caused to rotate at a speed indicated by 6th, this being the same speed as the input shaft 22, thereby establishing the sixth gear (6th), having a gear ratio that is smaller than that of the fifth gear (5th). The gear ratio of the sixth gear (6th) is 1.0.

When the second clutch C2 and the third clutch C3 are engaged to rotate the first rotating element RM1 at a speed reduced via the first transmission part 14 relative to the input shaft 22 and to cause the second rotating element RM2 to rotate in concert with the input shaft 22, the third rotating element RM3 is caused to rotate at a speed indicated by 7th, thereby establishing the seventh gear (7th), having a gear ratio that is smaller than that of the sixth gear (6th).

When the second clutch C2 and the first brake B1 are engaged to rotate the second rotating element RM2 in concert with the input shaft 22 and to stop the rotation of the first rotating element RM1, the third rotating element RM3 is caused to rotate at a speed indicated by 8th, thereby establishing the eighth gear (8th), having a gear ratio that is smaller than that of the seventh gear (7th).

When the third clutch C3 and the second brake B2 are engaged to rotate the first rotating element RM1 at a speed reduced via the first transmission part 14 relative to that of the input shaft 22 and to stop the rotation of the second rotating element RM2, the third rotating element RM3 rotates in reverse at a speed indicated by "Rev1", thereby establishing the first reverse gear Rev1, having the largest gear ratio in the reverse direction. When the fourth clutch C4 and the second brake B2 are engaged to rotate the first rotating element RM1 in concert with the input shaft 22 and to stop the rotation of the second rotating element RM2, the third rotating element RM3 is caused to rotate in reverse at a speed indicated by Rev2, thereby establishing the second reverse gear (Rev2), having a gear ratio that is smaller than that of the first reverse gear (Rev1). The first reverse gear (Rev1) and the second reverse gear (Rev2) correspond, respectively, to the first gear and second gear in the reverse rotation direction.

The automatic transmission 10 of this embodiment as described above establishes a plurality of gears having different gear ratios by selectively engaging a plurality of engaging elements, specifically the clutches C1 to C4 and the brakes B1 and B2. By the first transmission part 14, which has the two intermediate output paths PA1 and PA2, which have different gear ratios, and the second transmission part 20, which has two sets of planetary gear units 16, 18, the engagement of the four clutches C1 to C4 and the two brakes B1, B2 is switched to achieve eight forward gears, thereby achieving compactness and facilitating installation in a vehicle. The clutches C1 to C4 and the brakes B1, B2 (hereinafter referred to as clutches C and brakes B when no particular distinction is made) are hydraulic type friction engagement devices, the engagement of which is controlled by a hydraulic actuator, such as a multiplate clutch or brake.

Figure 4:
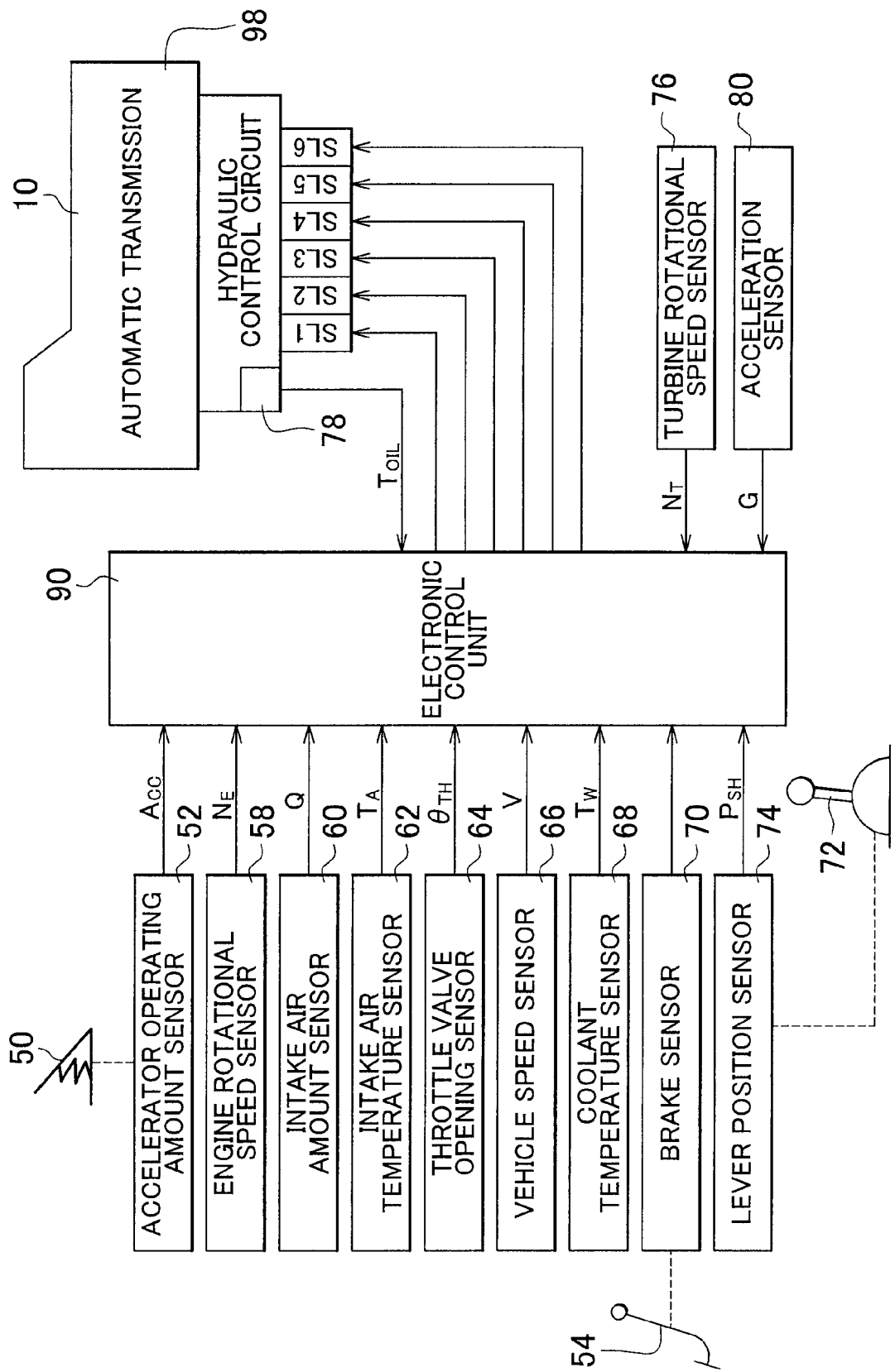
FIG. 4 is a block diagram describing the relevant part of the control system provided in a vehicle for controlling the automatic transmission as shown in FIG. 1.

FIG. 4 is a block diagram describing the main part of the control system provided in a vehicle to control, for example, the automatic transmission 10 shown in FIG. 1. The electronic control unit (hereinafter "ECU") 90 shown in FIG. 4 includes a microcomputer having such elements as a CPU, RAM, ROM, and an input/output interface. The temporary storage function of the RAM is used while executing a program stored beforehand in the ROM to perform signal processing to execute output control of the engine 30 and gear shift control of the automatic transmission 10, with division between a part for engine control and a part for gear shift control being made as necessary.

In FIG. 4, the accelerator operation amount Acc of an accelerator pedal 50 is detected by the accelerator operation amount sensor 52, and a signal indicating the accelerator operation amount Acc is supplied to the electronic control unit 90. Because the accelerator pedal 50 is depressed a large amount in response to an amount of output demanded by a driver, accelerator pedal 50 corresponds to the accelerator operating member and the accelerator operation amount Acc indicates the output demand amount. Also, a signal indicating the depression amount $\theta_{SC}$ of the brake pedal 54 of the foot brake is supplied to the electronic control unit 90. The brake pedal 54 may be depressed a large amount in response to a deceleration demand from the driver. The brake pedal 54 corresponds to the brake operating member and the associated depression amount $\theta_{SC}$ indicates the brake operating amount.

Sensors provided include an engine rotational speed sensor 58 to detect the rotational speed $N_E$ of the engine 30, an intake air amount sensor 60 to detect the intake air amount Q of the engine 30, an intake air temperature sensor 62 to detect the temperature $T_A$ of the intake air, a throttle valve opening sensor 64 with an idle switch to detect the fully open condition (idle condition) and the opening $\theta_{TH}$ of the electronic throttle valve of the engine 30, a vehicle speed sensor 66 to detect the vehicle speed V (corresponding to the rotational speed $N_{OUT}$ of the output shaft 24), a coolant temperature sensor 68 to detect the coolant temperature $T_W$ of the engine 30, a brake sensor 70 to detect whether the brake pedal 54 is depressed and the depression amount $\theta_{SC}$ thereof, a lever position sensor 74 to detect the lever position (operating position) $P_{SH}$ of the shift lever 72, a turbine rotational speed sensor 76 to detect the turbine rotational speed $N_T$ (that is, the rotational speed $N_{IN}$ of the input shaft 22), an automatic transmission oil temperature sensor 78 to detect the automatic transmission oil temperature $T_{OIL}$, which is the temperature of the operating fluid inside the hydraulic control circuit 98, and an acceleration sensor 80 to detect the acceleration (including deceleration) G of the vehicle. These sensors and switches output to the electronic control unit 90 signals that indicate, for example, the engine rotational speed $N_E$, the intake air amount Q, the intake air temperature $T_A$, the throttle valve opening $\theta_{TH}$, the vehicle speed V, the engine coolant temperature $T_W$, the depression amount $\theta_{SC}$ indicating whether the brake pedal is operated and the depression amount thereof, the lever position $P_{SH}$ of the shift lever 72, the turbine rotational speed $N_T$, the automatic transmission oil temperature $T_{OIL}$, and the acceleration (including deceleration) G of the vehicle.

Figure 5:
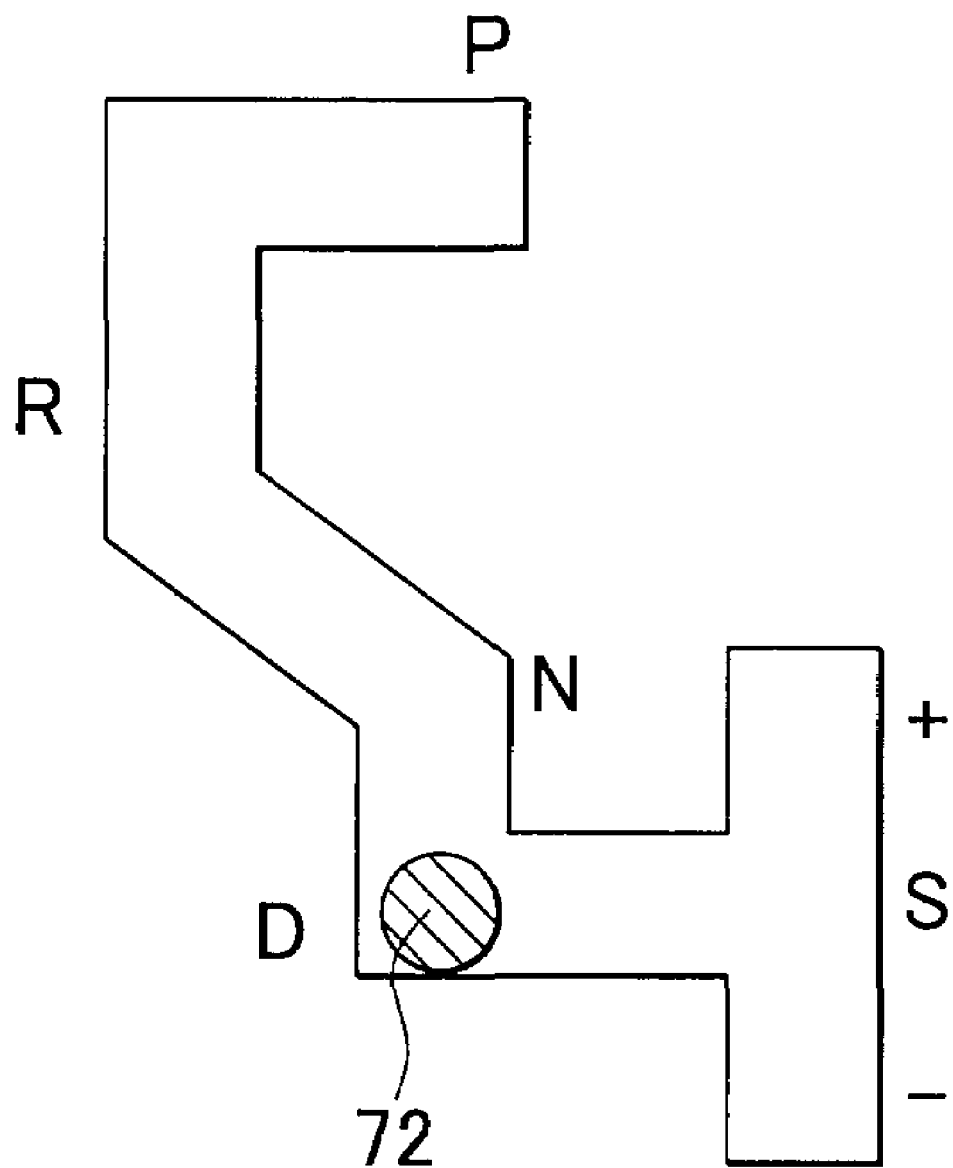
FIG. 5 is a drawing describing the operating positions of the shift lever shown in FIG. 4.

The shift lever 72 is disposed, for example, in the vicinity of the driver's seat and, as shown in FIG. 5, may be manually operated to the five lever positions P, R, N, D, and S. The P position the park position, in which the automatic transmission 10 is disengaged and also in which a mechanical parking mechanism prevents the rotation of the output shaft 24. The R position is the reverse position, in which the output shaft 24 of the automatic transmission 10 is rotated in the reverse direction. The N position is the neutral position, in which the drive is disengaged from the automatic transmission 10. The D position is the drive position, in which the automatic gear shifting control is executed over the allowable gear shifting range (D range) from first gear to eighth gear of the automatic transmission 10. The S position is a drive position in which manual gear shifting is possible between a plurality of different gear shifting ranges or between a plurality of different gears that can be gear shifted at the high-speed end. The S position includes a "+" position for shifting up the gear shift range or gear each time the shift lever 72 is operated, and a "−" position for shifting down the gear shift range or gear each time the shift lever 72 is operated. The lever position sensor 74 detects at what lever position (operating position) $P_{SH}$ the shift lever 72 is set.

The hydraulic control circuit 98 has, for example, a manual valve linked to the shift lever 72 via a cable or link, the manual valve being mechanically operated by the shift lever 72 to switch the hydraulic circuit within the hydraulic control circuit 98. For example, in the D position and the S position, the forward hydraulic pressure PD is output to mechanically establish the forward driving circuit, wherein it is possible to drive forward while shifting gears between the first (1st) to the eighth (8th) gears which are the forward gears. When the shift lever 72 is in the D position, the ECU 90 determines that condition by the signal from the lever position sensor 74 and establishes the automatic shifting mode, in which gear shifting control is executed using all of the forward gears from the first (1st) to the eighth (8th).

The ECU 90 determines the gear shift from a relationship stored beforehand (in a map or gearing shifting graph), with the actual vehicle speed V and the accelerator operating amount Acc as parameters, and functions as a transmission controller 100 (refer to FIG. 8) that executes the gear shift control to achieve the determined gear shift, to establish a gear on the low-speed side, in which the gear ratio is large, for example, when the vehicle speed V is low or the accelerator operating amount Acc has increased. In the gear shift control, in order to establish the determined gear, the excitation/non-excitation or current control of linear solenoid valves SL1 to SL6 within the hydraulic control circuit 98 used for gear shifting is executed to engage and disengage the clutches C and the brakes B, and to control the transient hydraulic pressure during the gear shifting process. That is, excitation/non-excitation of the linear solenoid valves SL1 to SL6 are each controlled to engage and disengage the clutches C and the brakes B, thereby establishing the appropriate forward gear. Various modes are possible, for example executing gear shift control based on the throttle opening $\theta_{TH}$, the intake air amount Q, or the road surface inclination.

Figure 6:
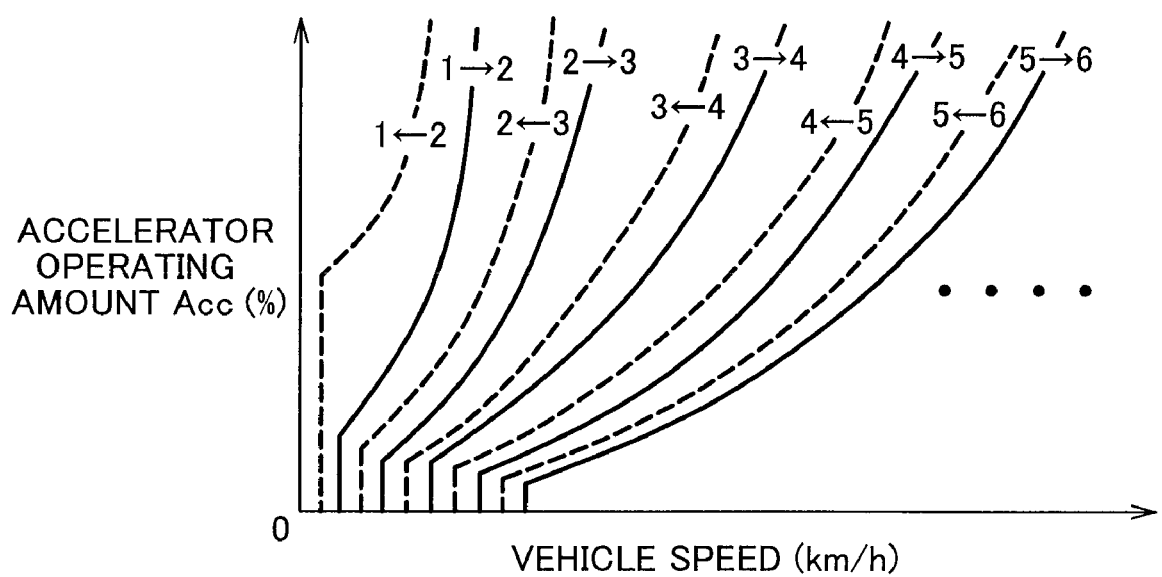
FIG. 6 is a graph showing an example of a gear shift graph used in gear shift control by the electronic control unit shown in FIG. 4.

In the gear shift graph of FIG. 6, the solid lines are gear shift lines for determining upshifts (upshift lines), and the broken lines are gear shift lines for determining downshifts (downshift lines). The gear shift lines in the gear shift graph of FIG. 6 are for the purpose of determining whether on the horizontal line representing the actual accelerator operation amount Acc (%) the actual vehicle speed V laterally crosses the lines, that is, whether the value $V_S$ has been exceeded. If the actual vehicle speed V exceeds the value $V_S$, the gear shift on the gear shift line should be executed. These lines are also stored as a collection of the values $V_S$, which is the vehicle speed for making a gear shift. The gear shift lines in FIG. 6 are shown as examples of the gear shift lines for the first to the sixth gears of the first to the eighth gears which are shifted in the automatic transmission 10.

Figure 7:
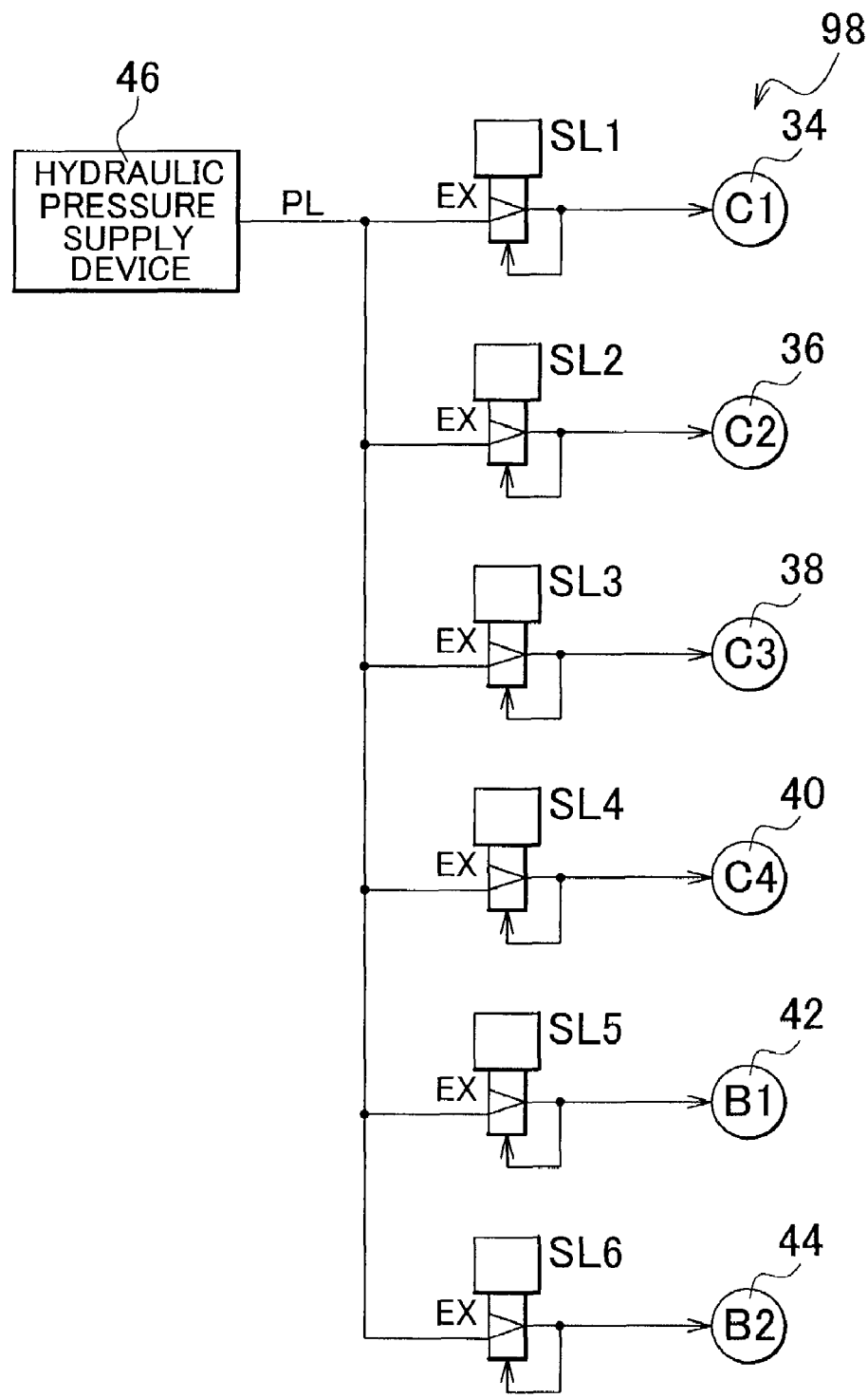
FIG. 7 is a drawing describing the relevant part of the hydraulic control circuit shown in FIG. 4.

FIG. 7 is a circuit diagram showing the part of the hydraulic control circuit 98 associated with the linear solenoid valves SL1 to SL6. In this drawing, actuators 34, 36, 38, 40, 42, and 44 of the clutches C1 to C4 and the brakes B1 and B2 are each supplied with pressure from the line hydraulic pressure PL that is output from the hydraulic pressure supply apparatus 46, which is adjusted by the linear solenoid valves SL1 to SL6. The hydraulic pressure supply apparatus 46 includes a mechanical oil pump 48 (refer to FIG. 1) that is rotationally driven by the engine 30 and a regulator valve or the like that adjusts the hydraulic line pressure PL, and controls the hydraulic line pressure PL in response to, for example, the engine load. The linear solenoid valves SL1 to SL6 are basically all of the same structure, and are independently controlled by the ECU 90 (refer to FIG. 4), the hydraulic pressure of each of the hydraulic actuators 34 to 44 is adjusted independently. In the gear shift control of the automatic transmission 10, so-called clutch-to-clutch gear shifting is executed, in which the engaging and disengagement of clutches C and brakes B involved in the gear shift are executed at the same time. For example, as shown in the engagement operation diagram of FIG. 2, in a downshift from the fifth gear to the fourth gear, clutch C2 is disengaged and clutch C4 is engaged and, to suppress gear shift shock, the transient disengagement hydraulic pressure of the clutch C2 and the transient engaging hydraulic pressure of the clutch C4 are appropriately controlled.

Figure 8:
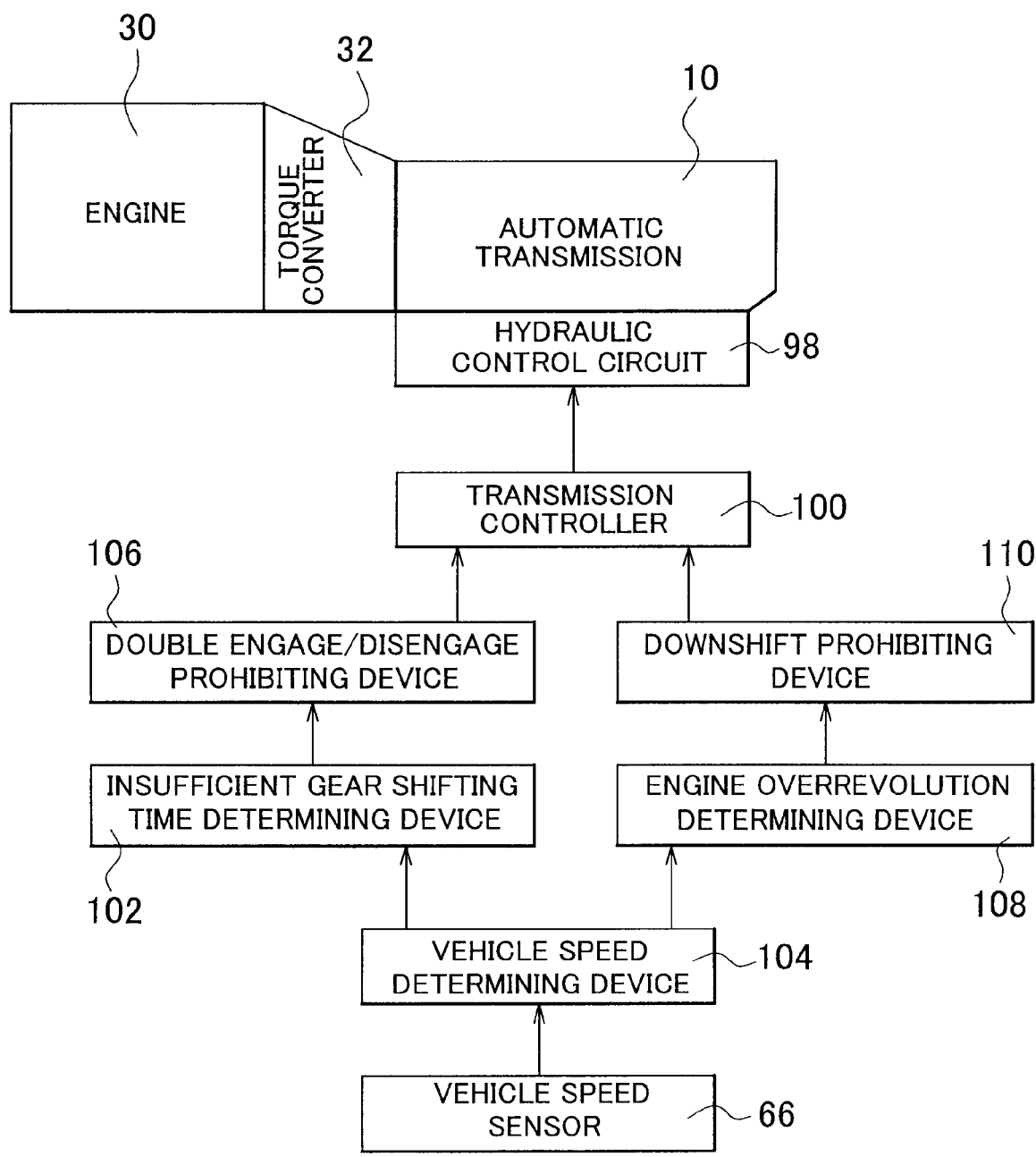
FIG. 8 is a block diagram describing the control operation of the relevant part, that is, the downshifting in the control function, of the electronic control unit shown in FIG. 4.

FIG. 8 is a functional block diagram describing the control operation in the ECU 90. Specifically, FIG. 8 describes a dual engagement/disengagement shift, in which two engaging elements are disengaged and two engaging elements are engaged. The dual disengage/engage gear shift operation, as shown in the engagement operation diagram of FIG. 2, includes, for example, a downshift from the eighth gear to the fourth gear (in which the clutch C2 and the brake B1 are disengaged and the clutch C1 and the clutch C4 are engaged), a downshift from the eighth gear to the third gear (in which the clutch C2 and the brake B1 are disengaged and the clutch C1 and the clutch C3 are engaged), a downshift from the seventh gear to the fourth gear (in which the clutch C2 and the clutch C3 are disengaged and the clutch C1 and the clutch C4 are engaged), a downshift from the seventh gear to the second gear (in which the clutch C2 and the clutch C3 are disengaged and the clutch C1 and the brake B1 are engaged), and a downshift from the sixth gear to the third gear (in which the clutch C2 and the clutch C4 are disengaged and the clutch C1 and the clutch C3 are engaged). In this embodiment, in a downshift from the eighth gear to the fourth gear, the eighth gear corresponds to the first speed step in an aspect of the present invention and the fourth gear corresponds to the second speed step of the present invention. Additionally, the clutch C2 and the brake B1 correspond to the first engaging element and the second engaging element in an aspect of the present invention, and the clutch C1 and the clutch C4 correspond to the third engaging element and the fourth engaging element in an aspect of the present invention. That is, the first speed step in an aspect of the present invention corresponds to a gear on the high-speed end (low gear ratio end) of the above-described gear shift pattern, and the second speed step therein corresponds to a gear on the low-speed end (high gear ratio end) of the shift pattern. The first engaging element and the second engaging element of an aspect of the present invention correspond to engaging elements that engage at a gear on the high-speed end, and the third engaging element and the fourth engaging element of an aspect of the present invention correspond to engaging elements that engage at a gear on the low-speed end. The transmission controller 100 shown in FIG. 8, for example, executes a gear shift determination based on the actual vehicle speed V and the accelerator operating amount Acc from a gear shift graph such as shown in FIG. 6 stored beforehand and, by making a gear shift output to the hydraulic control circuit 98 for the purpose of executing the determined gear shift, executes automatic gear shifting of the automatic transmission 10.

An insufficient gear shifting time determining device 102 determines whether the time for gear shifting is insufficient, for example, when downshifting from the eighth gear to the fourth gear. The gear shifting time is determined as being insufficient based on the vehicle speed V determined by the vehicle speed determining device 104 based on the vehicle speed signal output from the vehicle speed sensor 66. Specifically, if the calculated vehicle speed V is equal to or lower than the reference vehicle speed V1 stored beforehand in the ROM of the ECU 90, the determination is made of insufficient shifting time.

If the vehicle speed V is low, that is, when the rotational speed $N_{IN}$ of the input shaft 22 of the automatic transmission 10 is low, and the difference between the rotational speed of the input shaft 22 and the rotational speed to which synchronization is to be done at the time of the gear shift is reduced, the time T1 that is the time at which the rotational speed of the input shaft 22 synchronizes to the rotational speed after the gear shift (gear shifting time T1, that is used as the reference) is reduced. As a result, the gear shifting time T1 serving as the reference may become shorter than the gear shifting time T2 actually required to shift gears. The gear shifting time T1 is used as a reference gear shifting time to determine whether an insufficient gear shifting time occurs, which is deemed to occur when the reference gear shifting time T1 is shorter than the actual gear shifting time T2 required to shift gears. The insufficient gear shifting time occurs when the gear shifting time T1 is shorter than the actual gear shifting time T2 required to shift gears. If a gear shift is executed in this condition the actual gear shift is delayed, because the reference gear shifting time T1 is short (that is, the gear shifting time is insufficient), there is a tendency for shift shock to occur.

In the insufficient gear shifting time determining device 102 an empirically determined reference vehicle speed V1, at which the gear shifting time used as the reference is substantially the same as the gear shifting time T2 required for an actual gear shift, may be set, and the determination of insufficient time is made if the vehicle speed V is below the reference vehicle speed V1. The reference vehicle speed V1 is set for each gear shifting pattern, such as a gear shift from the eighth gear to the fourth gear. The reference vehicle speed V1 in this embodiment corresponds to the prescribed vehicle speed in an aspect of the present invention.

A double engage/disengage prohibiting device 106 prohibits a gear shift in the case in which the insufficient gear shifting time determining device 102 determines that the gear shifting time to disengage two engaging elements and engage two engaging elements would be insufficient, for example when shifting from the eighth gear to the fourth gear. In this case, for example, in a gear shift from the eighth gear to the fourth gear, a command is output from the ECU 90 to execute a gear shift from the eighth gear to the fifth gear, and then execute a gear shift from the fifth gear to the fourth gear. By dividing the gear shift in this manner, the shifting from the eighth gear to the fifth gear in the automatic transmission 10, requires a generally known clutch-to-clutch gear shift of engaging one engaging element and disengagement one engaging element and, in the same manner, a shift from the fifth gear to the fourth gear requires a generally known clutch-to-clutch gear shift of engaging one engaging element and disengagement one engaging element. By doing this, although time is required to shift from the eighth gear to the fourth gear, shift shock generated from the automatic transmission 10 is suppressed.

An engine overrevolution determining device 108 determines whether the rotational speed $N_E$ of the engine 30 after a downshift exceeds an allowable rotational speed of the engine 30. For example, in downshifting from fourth gear to third gear, a determination is made that a gear shift is not possible if the resulting rotational speed $N_E$ of the engine 30 would exceed the allowable rotational speed. In this embodiment, the determination is made that a gear shift is impossible when the current vehicle speed V exceeds an engine overrevolution threshold speed V2 stored in the ECU 90. Specifically, the vehicle speed V calculated by the vehicle speed determining device 104 is compared with the threshold vehicle speed V2 set for the current gear and it is determined that gear shifting is impossible when the vehicle speed V exceeds the threshold vehicle speed V2. The threshold vehicle speed V2 is set for each gear, based on the allowable rotational speed of the engine 30, and is set in the vicinity of a vehicle speed at which the rotational speed $N_E$ of the engine 30 may exceed its maximum allowable rotational speed if the transmission is downshifted to the next lower gear. When the engine overrevolution determining device 108 determines that a gear shift is impossible, the downshift prohibiting device 110 prohibits downshifting.

Figure 9:
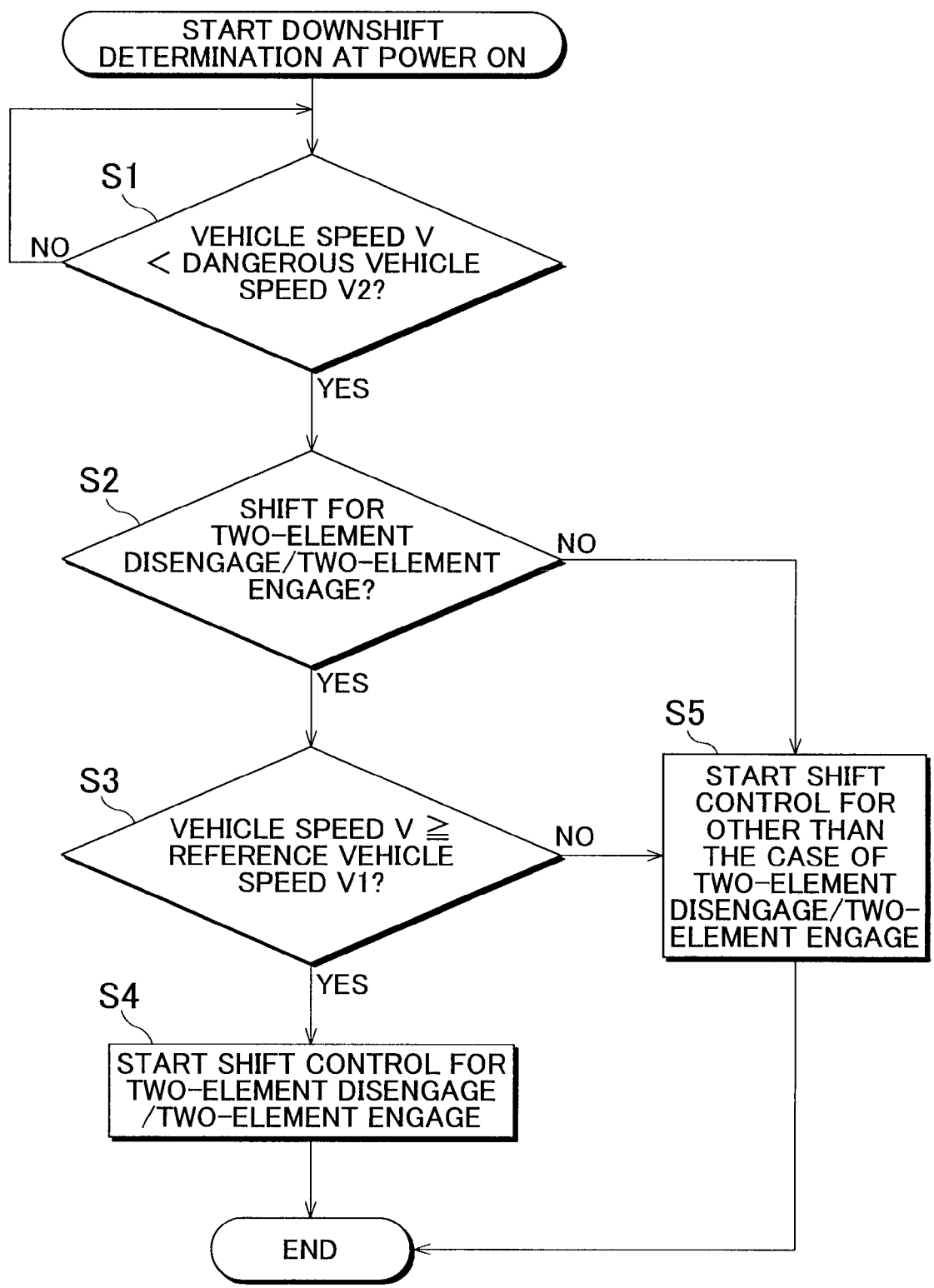
FIG. 9 is a flowchart showing the relevant part of the downshift control by the electronic control unit shown in FIG. 4.

FIG. 9 is a flowchart describing the downshift control in the ECU 90, which is executed at prescribed intervals.

First, at step S1 (the term "step" omitted hereinafter), which corresponds to the engine overrevolution determining device 108 and the downshift prohibiting device 110, a determination is made whether a downshift is possible, based on the vehicle speed V calculated by the vehicle speed determining device 104. While the determination at S1 is negative, the downshift prohibiting device 110 prohibits downshifting. The determination of S1 is made repeatedly until it is determined that the vehicle speed V is below the threshold vehicle speed V2, resulting in an affirmative result at S1, after which in S2 a determination is made as to whether the ECU 90 has selected a downshift that entails the disengagement of two engaging elements and the engagement of two engaging elements, for example, a downshift from the eighth gear to the fourth gear (in which the two engaging elements clutch C2 and brake B1 are disengaged and the clutch C1 and the clutch C4 are engaged. If the result at S2 is negative, the determination at S5 is that this is not double engaging/disengaging gear shift. For example, in the case of a gear shift from the eighth gear to the sixth gear, a well-known clutch-to-clutch gear shift, in which one engaging element is disengaged and one engaging element is engaged, is executed, and the processing of this routine ends. In contrast, if the result at S2 is affirmative and a downshift is selected that entails a double engaging/disengaging operation, at S3, which corresponds to the insufficient gear shifting time determining device 102, a determination is made of whether the vehicle speed V equals or exceeds the reference vehicle speed V1.

As described above, S3 indirectly determines whether the gear shifting time T2 required to actually making a gear shift is shorter than the reference gear shifting time T1, that is, whether the gear shifting time in insufficient. If the S3 result is affirmative, the gear shifting time required for a downshift that disengages two engaging elements and engages two engaging element, and at S4 a downshift from, for example, eighth gear to fourth gear, which is performed by the disengagement of two engaging elements and the engagement of two engaging elements, is executed, at which point the routine ends. In this downshift as well, the slip amount of the engaging elements is appropriately controlled by the ECU 90 to suppress shift shock.

If the result of S3 is negative, however, the gear shifting time is insufficient for a gear shift that disengages two engaging elements and engages two engaging elements, and at S5, which corresponds to the double engage/disengage prohibiting device 106, a downshift that disengages two engaging elements and engages two engaging elements is prohibited and instead a gear shift via an intermediate gear such as described above is executed, and the routine is ended.

As described above, according to this embodiment, when the insufficient gear shifting time determining device 102 determines that the gear shifting time is insufficient for a double engage/disengage gear shift the double engage/disengage prohibiting device 106 prohibits a gear shift that disengages two engaging elements and engages two engaging elements. Thus, it is possible to stop the forcing of a gear shift for which the gear shifting time is insufficient, and to stop the generation of shift shock by such a forced gear shift.

Because in this embodiment a shift that disengages two engaging elements and engages two engaging elements is a downshift, it is possible to suppress the generation of shift shock by such a forced downshift.

According to this embodiment, the insufficient gear shifting time determining device 102 determines that the gear shifting time is insufficient when the vehicle speed V calculated from the vehicle speed determining device 104 is equal to or lower than the reference vehicle speed V1, thereby determining that the gear shift is impossible, it is relatively easy to determine that the gear shifting time is insufficient.

Also, according to this embodiment, when the engine overrevolution determining device 108 determines that a gear shift is impossible, because the downshift prohibiting device 110 prohibits a downshift, the rotational speed $N_E$ of the engine 30 is prevented from exceeding the maximum allowable engine speed.

Although the embodiment of the present invention is described above based on the drawings, the present invention can be applied as well to other aspects thereof.

For example, in the foregoing embodiment the automatic transmission 10 has the clutches C and the brakes B as engaging elements to establish a plurality of speed steps having different gear ratios by selectively engaging the engaging elements, the present invention is not restricted to this, and may have engaging elements that are electromagnetically controlled, such as an electromagnetic clutch or magnetic powder type clutch.

Although in the above-described embodiment, the disengagement pressure and engagement pressure for the hydraulic friction engaging apparatuses are directly controlled to downshift by using the linear solenoid valves SL1 to SL6, it is alternatively possible to adopt a mechanism that executes indirect control via other valves. For example, shift valves to control gear shifting may be provided in the present invention separate from the linear solenoid valves SL1 to SL6, the shift valves being controlled by the pilot pressures output from the linear solenoid valves SL1 to SL6.

Although in the above-described embodiment the automatic transmission 10 is a multispeed transmission having eight forward driving gears and two reverse driving gears that are shifted by the selective linking of the rotating elements of a plurality of planetary gear units 12, 16, 18 by hydraulic friction engagement apparatuses (C1 to C4, B1, B2), it is sufficient that the automatic transmission selectively achieve a plurality of speed steps. For example, the automatic transmission can be an automatic transmission that has five, six, seven, nine, or more forward gears. Although the vehicle in the present embodiment is an FR (front-engine, rear-drive) vehicle, in which the shaft axis of the automatic transmission 10 is in the front-to-rear direction of the vehicle, the present invention can alternatively be applied to an FF (front-engine, front-drive) vehicle, in which the shaft axis of the automatic transmission is in the sidewise direction of the vehicle.

Also, although in the above-described embodiment the present invention is applied in downshifting, the present invention is not restricted to downshifting, and may be applied also to upshifting.

Also, although in the above-described embodiment the insufficient gear shifting time determining device 102 and the engine overrevolution determining device 108 make determinations using the vehicle speed V as the determining criterion, the present invention may be embodied using another parameter as the determining criterion, for example, such as the rotational speed $N_I$ of the input shaft 22 as a reference value.

Also, although in the above-described embodiment when the insufficient gear shifting time determining device 102 determines that the gear shifting time is insufficient, the double engage/disengage prohibiting device executes, for example, a process to make a gear shift from eighth gear to fourth gear after shifting to fifth gear. However, this is merely exemplary. For example, the present invention may be adapted to execute other gear shifting operations, with the exception of prohibiting a gear shift that disengages two engaging elements and engages two engaging elements, such as downshifting sequentially.

Although in the above-described embodiment the reference vehicle speed V1 is set for each gear shifting pattern, such as downshifting from eighth gear to fourth gear, this is merely an example. For example, an embodiment may also be provided in which a reference vehicle speed V1 is common to each gear shifting pattern, in which case it is necessary to set a reference vehicle speed V1 that may be applied to each gear shifting pattern.

The foregoing is no more than one embodiment, and a person skilled in the art has the knowledge to enable embodiment of various modifications and improvements thereof.

What is claimed is:

1. An automatic transmission controller of a vehicle, the controller comprising:
    an automatic transmission that establishes a first speed step by engaging a first engaging element and a second engaging element, and that establishes a second speed step by engaging a third engaging element and a fourth engaging element;
    a transmission controller that controls a double engaging/disengaging gear shift in shifting from the first speed step to the second speed step;
    an insufficient gear shifting time determining device that determines whether a gear shifting time to shift from the first speed step to the second speed step is insufficient; and
    a double engage/disengage prohibiting device that prohibits the gear shift from the first speed step to the second speed step when the insufficient gear shifting time determining device determines that the gear shifting time to shift from the first speed step to the second speed step is insufficient.

2. The automatic transmission controller for a vehicle according to claim 1, wherein the gear ratio of the first speed step is smaller than a gear ratio of the second speed step, and the gear shift from the first speed step to the second speed step is a downshift.

3. The automatic transmission controller for a vehicle according to claim 1 further comprising:
    a vehicle speed determining device that calculates a vehicle speed,
    wherein the insufficient gear shifting time determining device determines that the gear shifting time is insufficient when the calculated vehicle speed is below a prescribed vehicle speed and determines that the gear shift is impossible.

4. The automatic transmission controller of a vehicle according to claim 2 further comprising:
    a vehicle speed determining device that calculates a vehicle speed,
    wherein the insufficient gear shifting time determining device determines that the gear shifting time is insufficient when the calculated vehicle speed is below a prescribed vehicle speed and determines that the gear shift is impossible.

* * * * *